(12) United States Patent
Hsieh

(10) Patent No.: US 6,389,720 B1
(45) Date of Patent: May 21, 2002

(54) TRIANGLE ROAD SIGN WITH SOLAR POWER-DRIVEN FLASHING LIGHT MEANS

(76) Inventor: Chin-Keng Hsieh, 1F., No. 15-7, Alley 5, Lane 125, Sec. 3, Yang Te Boulevard, Taipei (TW)

( * ) Notice: Subject to any disclaimer, the term of this patent is extended or adjusted under 35 U.S.C. 154(b) by 0 days.

(21) Appl. No.: 09/553,671

(22) Filed: Apr. 20, 2000

(51) Int. Cl.[7] ................................................ G09F 21/04
(52) U.S. Cl. ............................ 40/593; 40/612; 40/903; 40/541; 116/63 T; 340/473
(58) Field of Search .......................... 40/593, 592, 591, 40/610, 612, 903, 541; 116/63 T, 63 P; 340/473

(56) References Cited

U.S. PATENT DOCUMENTS

| | | | |
|---|---|---|---|
| 3,625,177 A | * 12/1971 | Miller ........................ | 116/63 P |
| 3,822,668 A | * 7/1974 | Schradieck et al. ......... | 116/63 P |
| 4,613,847 A | * 9/1986 | Scolari et al. ............... | 340/473 |
| 4,875,028 A | * 10/1989 | Chou .......................... | 340/473 |
| 5,572,188 A | * 11/1996 | McDowell ................... | 340/573 |
| 5,606,309 A | * 2/1997 | Smith .......................... | 340/473 |
| 5,627,513 A | * 5/1997 | Weed et al. ................. | 340/573 |
| 5,651,636 A | * 7/1997 | Yeh .............................. | 404/9 |
| 6,092,318 A | * 7/2000 | Arie et al. .................... | 40/547 |

* cited by examiner

*Primary Examiner*—Jack Lavinder
*Assistant Examiner*—William L. Miller
(74) *Attorney, Agent, or Firm*—Varndell & Varndell, PLLC (57) ABSTRACT

A triangle road sign having a bottom rack, a left frame bar and a right frame bar respectively pivoted to two distal ends of the bottom rack and detachably coupled to each other to form a triangle rack with the bottom rack, a device for securing the triangle rack to the inside of a car, indicator lights respectively installed in the bottom rack, the left frame bar and the right frame bar and controlled to flash by a control switch at the bottom rack, a solar collector installed in the bottom rack to collect solar energy and to convert collected solar energy into electricity for the signal lights at the bottom rack, the left frame bar and the right frame bar, a battery box installed in the bottom rack and controlled by the control switch to provide the necessary working voltage to the signal lights, an alternating current adapter controlled by the control switch to convert alternating current power supply to direct current power supply for the signal lights.

2 Claims, 9 Drawing Sheets

TRIANGLE ROAD SIGN WITH SOLAR POWER-DRIVEN FLASHING LIGHT MEANS

BACKGROUND AND SUMMARY OF THE INVENTION

The present invention relates to a triangle road sign, and more particularly to such a triangle road sign, which comprises a flashing light circuit assembly selectively driven by solar power, battery power, or alternating current power source to give a flashing warning signal.

Figure 1:
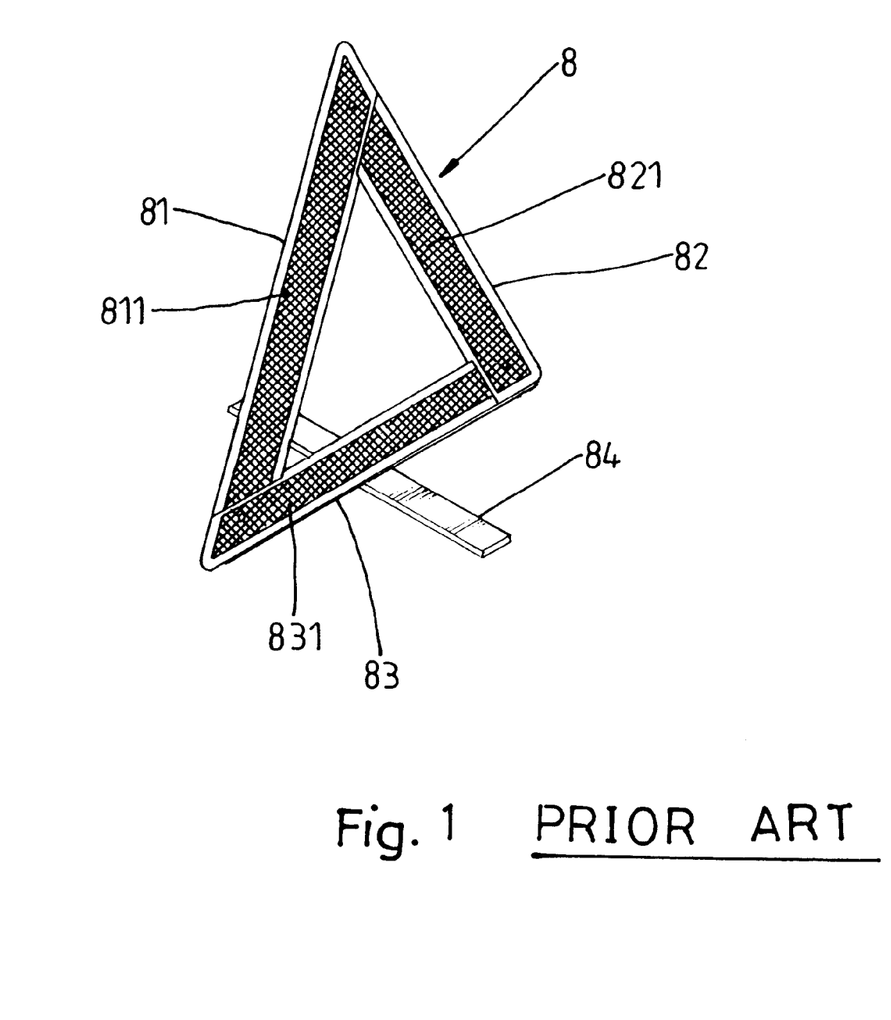
FIG. 1 is an elevational view of a triangle road sign according to the prior art.
Figure 2:
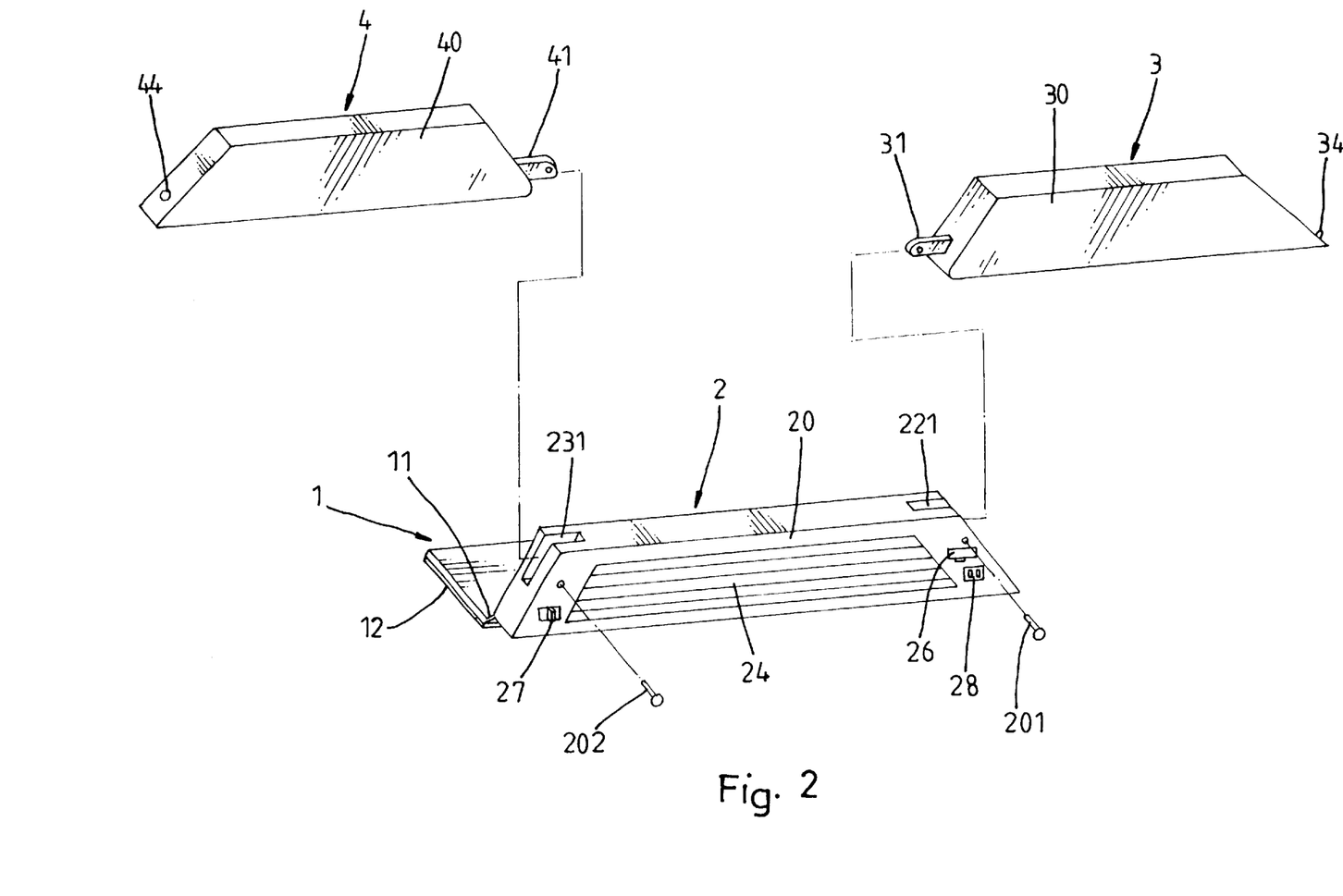
FIG. 2 is an exploded view of a triangle road sign according to the present invention (the top mounting device and the connecting members excluded).
Figure 3:
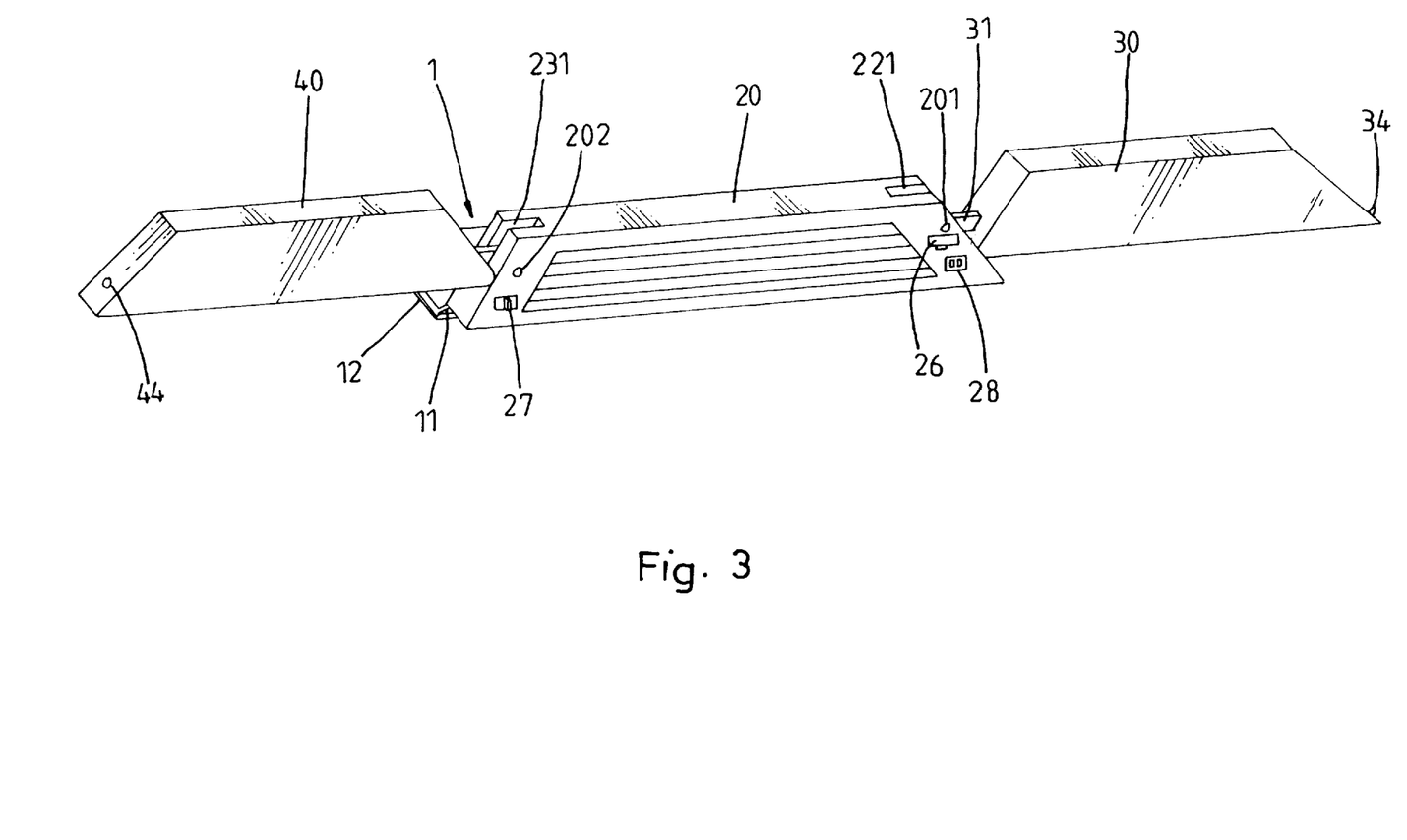
FIG. 3 is an assembly view of FIG. 2, showing the left frame bar and the right frame bar respectively pivoted to the bottom rack and extended out.
Figure 4:
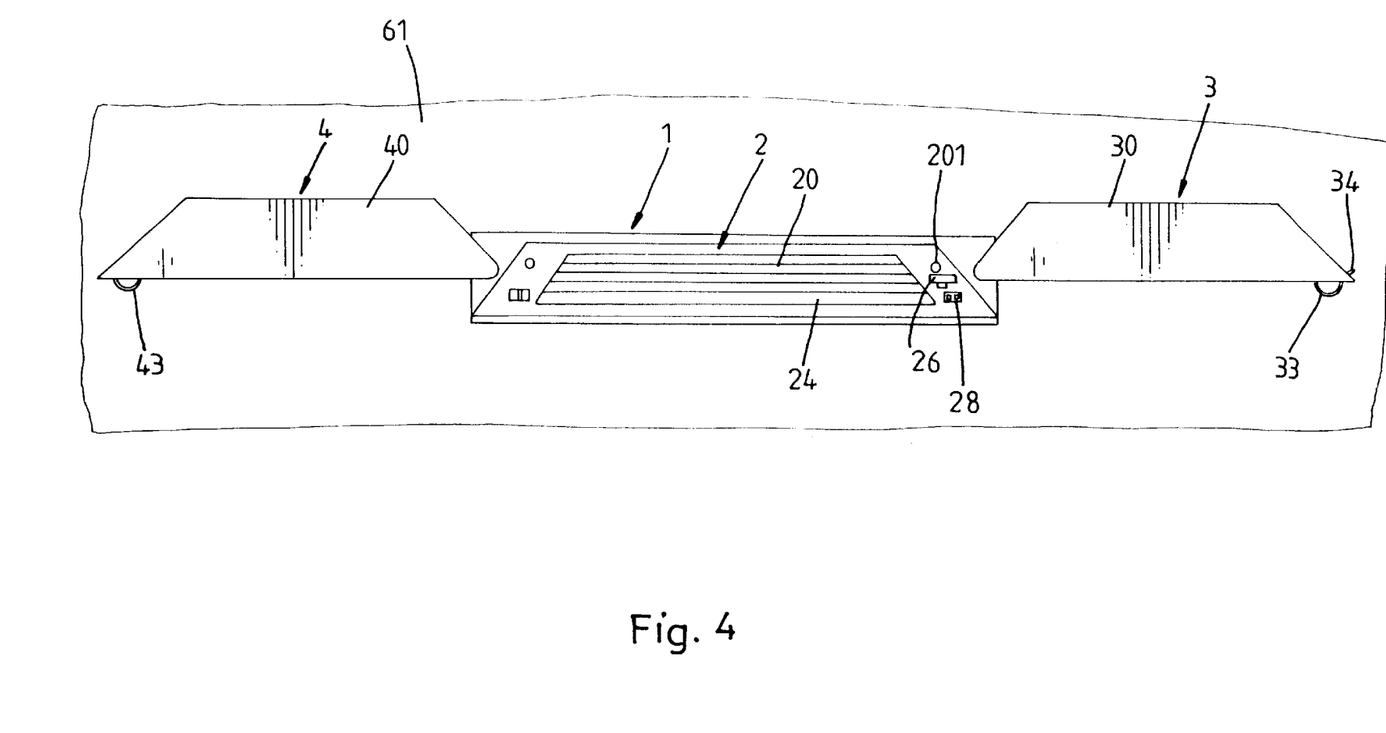
FIG. 4 is a plain view showing the assembly of FIG. 3 installed in a part inside a car.
Figure 5:
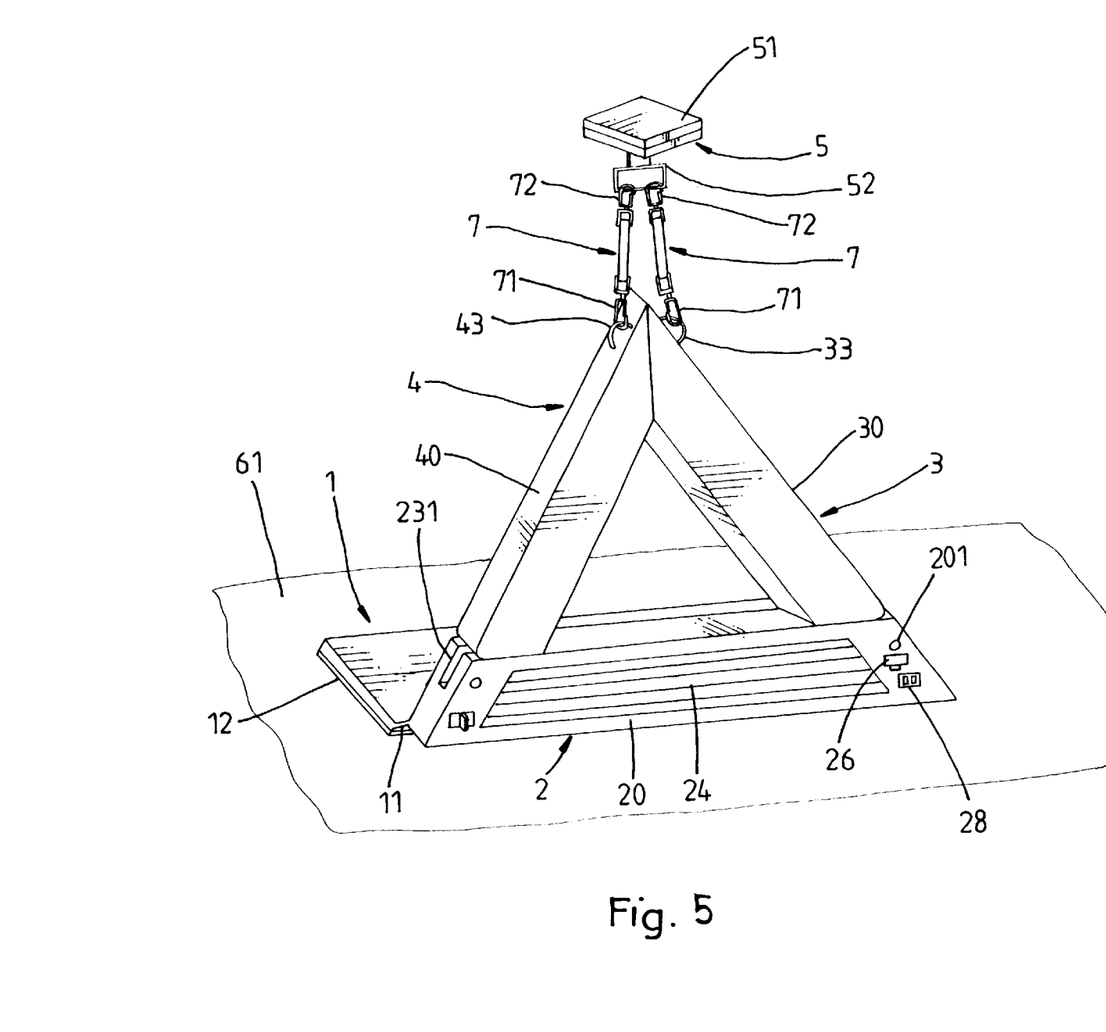
FIG. 5 shows the triangle road sign set in the operative position in a car.
Figure 6:
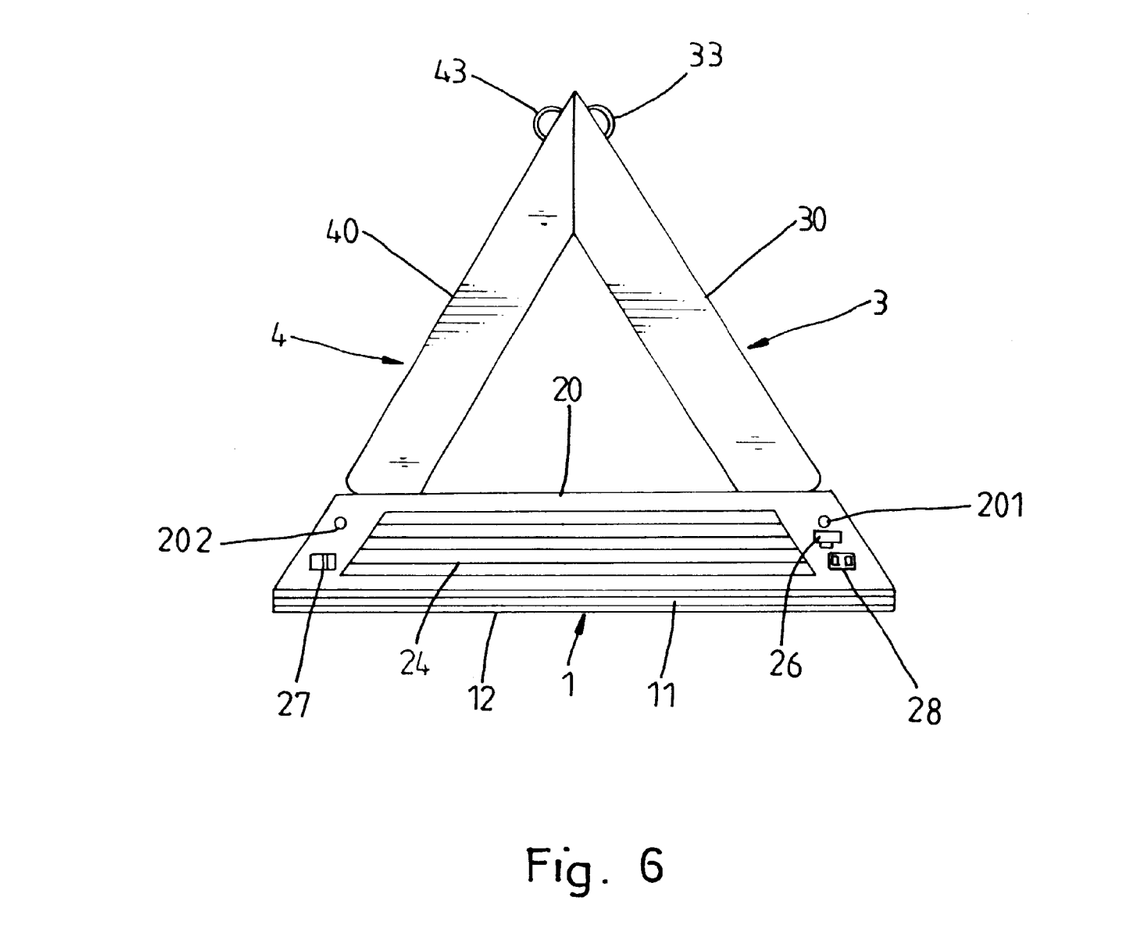
FIG. 6 is a front side view of the triangle road sign after removal of the top mounting device and the connecting members.
Figure 7:
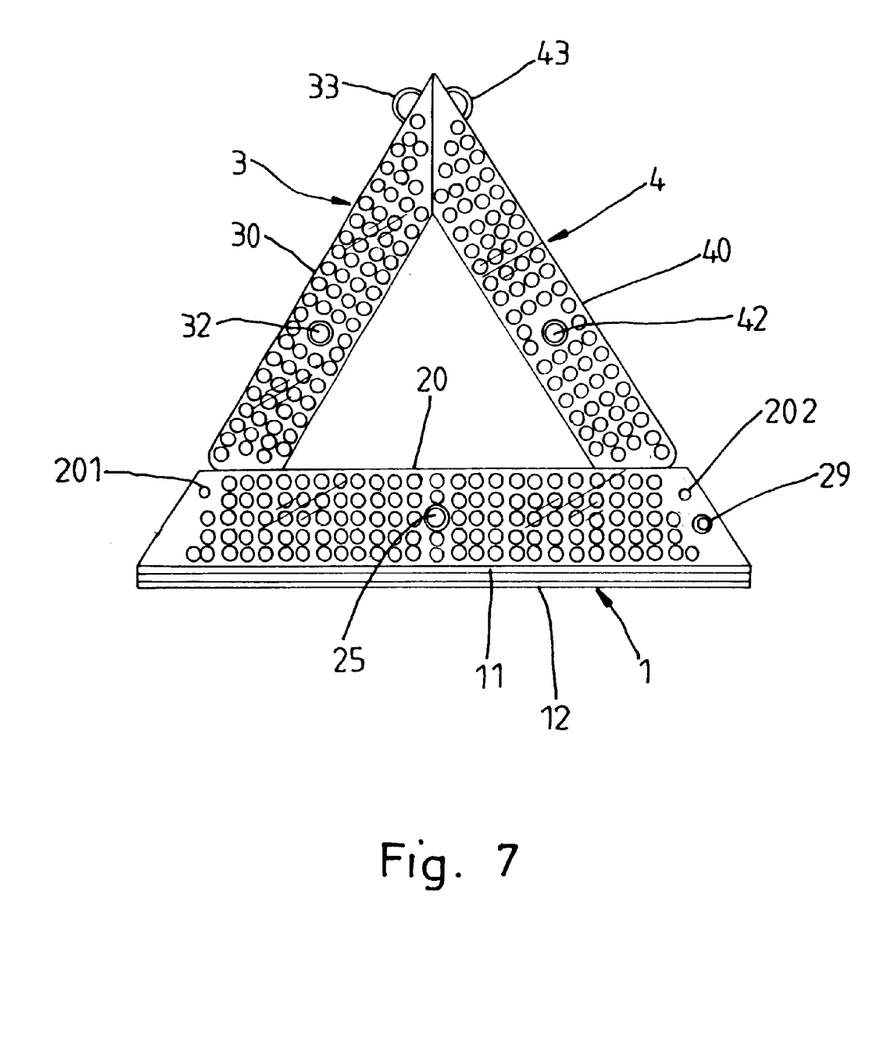
FIG. 7 is a rear side view of FIG. 6.

A conventional triangle road sign 8, as shown in FIG. 1, is generally comprised of a left frame bar 81, a right frame bar 82, a bottom frame bar 83, a stand 84, and reflectors 811, 821 and 831 respectively covered on the frame bars 81, 82 and 83. This structure of triangle road sign 8 is less effective because it can only give a static warning signal.

It is one object of the present invention to provide a triangle road sign, which is folding collapsible. It is another object of the present invention to provide a triangle road sign, which actively gives a warning signal. It is still another object of the present invention to provide a triangle road sign, which selectively uses solar power, battery power, or solar power source to drive flashing light circuit means to give a flashing warning signal. According to one aspect of the present invention, the triangle road sign is comprised of a folding collapsible triangle rack formed of a bottom rack, a left frame bar and a right frame bar, mounting means for securing the triangle rack to the inside of a car, flashing light circuit means mounted on the triangle rack and controlled to give a flashing warning signal, and solar power circuit means that converts solar energy into electricity for the flashing light circuit means. According to another aspect of the present invention, battery power supply and alternating current power adapter are provided and selectively controlled to provide the necessary working voltage to the flashing light circuit means. In an alternate form of the present invention, the mounting means for securing the triangle rack to the inside of a car is eliminated, and a folding collapsible stand is provided to support the triangle rack on the road.

DETAILED DESCRIPTION OF THE PREFERRED EMBODIMENT

Referring to FIGS. from 4 through 8, a triangle road sign in accordance with the present invention is generally comprised of a bottom mounting plate 1, a bottom rack 2, a left frame bar 3, a right frame bar 4, a top mounting device 5, and two connecting members 7.

Figure 8:
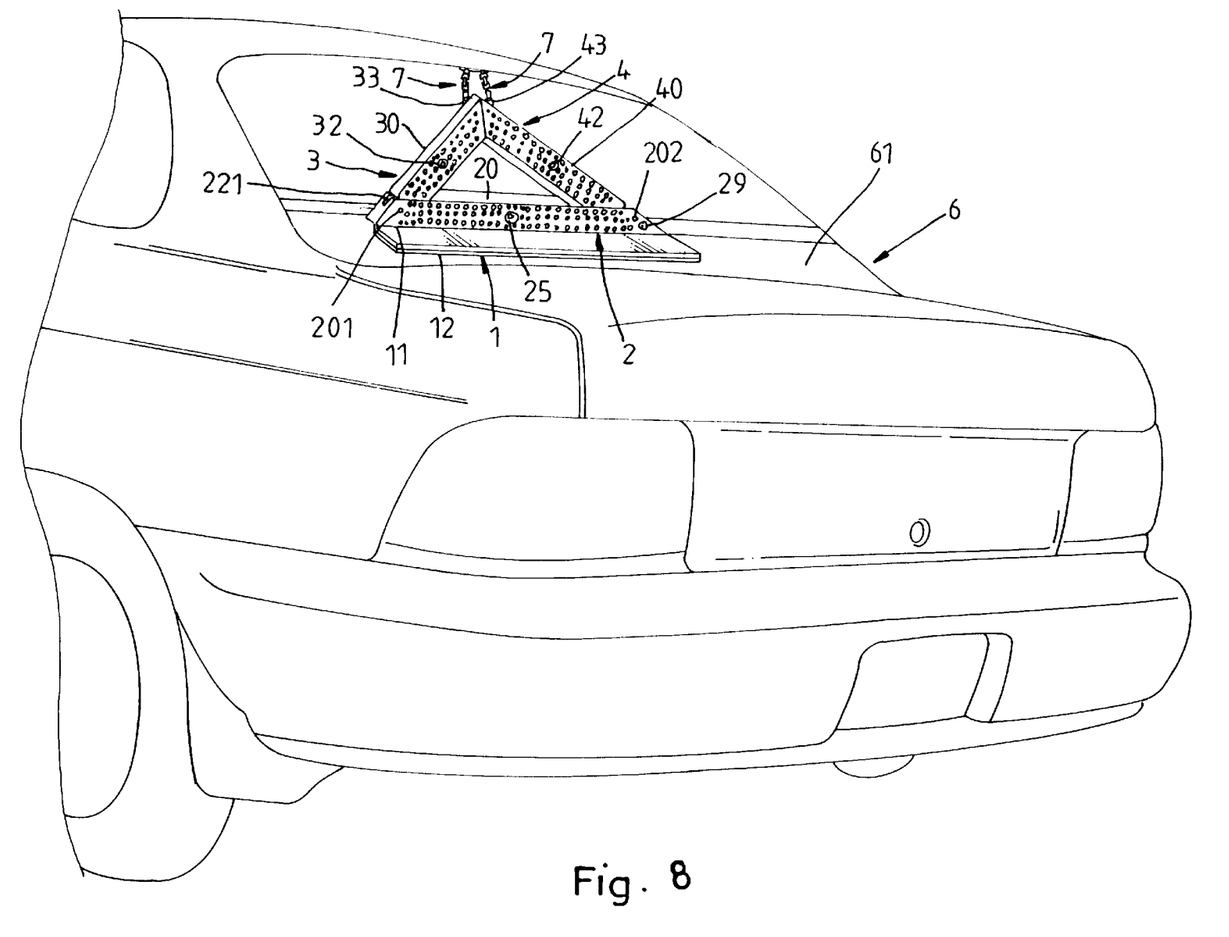
FIG. 8 illustrates the triangle road sign installed in the car near the rear window according to the present invention.

The bottom mounting plate 1 has one side edge 11 hinged to the bottom rack 2, and a bottom side wall 12 fixedly fastened to a part 61 inside a car 6 near the rear window by adhesive or fastening members (see FIG. 8). The bottom rack 2 comprises a transparent rack shell 20 hinged to the bottom mounting plate 1, a solar collector panel 24 mounted on a front side of the transparent rack shell 20, a signal light 25 mounted in a back side of the transparent rack shell 20 (see FIGS. 7 and 8), a control switch 27 mounted on the transparent rack shell 20, a flashing circuit (not shown) installed in the transparent rack shell 20 and controlled by the control switch 27 to flash the signal light 25, a solar battery circuit (not shown) installed in the transparent rack shell 20 and connected between the flashing circuit and the solar collector panel 24 throught he control switch 27 to convert solar energy collected from the solar connector panel 24 into electricity and to store the electricity thus obtained for the flashing circuit and the signal light 25, an indicator light 29, which indicated battery charging status of the solar battery circuit, a rechargeable battery (not shown) installed in the transparent rack shell 20 and controlled by the control switch 27 to provide the necessary working voltage to the flashing circuit and the signal light 25, an alternating current adapter 28 installed in the transparent rack shell 20 for receiving external alteranting current power supply to charge the rechargeable battery, and a battery box 26 installed in the transparent rack shell 20 and controlled by the control switch 27 to provide the necessary working voltage to the flashing circuit and the signal light 25. The transparent rack shell 20 comprises two coupling notches 221 and 231 at two distal ends thereof for receiving the left frame bar 3 and the right frame bar 4. The left frame bar 3 comprises a transparent body 30, a coupling rod 31 extended from one end of the transparent body 30 and pivotally secured to one coupling notch 221 at the transparent rack shell 20 of the bottom rack 2 by a pivot 201, a signal light 32 installed in the back side of the transparent body 30 and controlled by the control switch 27 to flash, a raised portion 34 raised from one end of the transparent body 30 remote from the coupling rod 31, and a locating ring 33 disposed near one end of the transparent body 30 adjacent to the raised portion 34 for the mounting of one connecting member 7. The right frame bar 4 comprises a transparent body 40, a coupling rod 41 extended from one end of the transparent body 40 and pivotally secured to one coupling notch 231 at the transparent rack shell 20 of the bottom rack 2 by a pivot 202, a signal light 42 installed in the back side of the transparent body 40 and controlled by the control switch 27 to flash, a recessed portion 44 formed on one end of the transparent body 40 remote from the coupling rod 41 for engagement with the raised portion 34 at the transparent body 30 of the left frame bar 33, and a locating ring 43 disposed near one end of the transparent body 40 adjacent to the recessed portion 44 for the mounting of one connecting member 7. The top mounting device 5 comprises a top mounting plate 51 fastened to the ceiling of the car 6 by adhesive or fastening means, and a bottom coupling loop 52 suspended from the top mounting plate 51 to hold the connecting members 7. The connecting members 7 are elastic members, each having one end terminating in a first hook 71 hooked on the bottom coupling loop 52 of the top mounting device 5 and a bottom end terminating in a second hook 72 hooked on the locating ring 33 and 43 at the left frame bar 3 or right frame bar 4.

When sunlight is available, the triangle road sign is put under the sun, enabling the solar collector panel 24 to collect the radiating energy of the sun for converting into electricity. When not in use, the bottom mounting plate 1 and the bottom rack 2 are turned toward each other and closely attached together to minimize space occupation. When in use, the left frame bar 3 and the right frame bar 4 are turned upwards from the bottom rack 2 toward each other to force the recessed portion 44 at the transparent body 40 of the right frame bar 41 into engagement with the raised portion 34 at the transparent body 40 of the right frame bar 41 into engagement with the raised portion 34 at the transparent body 30 of the left frame bar 3, and then connecting members 7 and the top mounting device 5 are fastened to the frame bars 3 and 4, and then the bottom mounting plate 1 and the top mounting device 5 are fastened to the inside of the car 6 to secure the triangle road sign in position, keeping the signal lights 25, 32 and 42 facing the rear window of the car 6. By menas of operating the control switch 27, the signal lights 25, 32 and 42 are driven to give a flashing warning signal. The signal lights 25, 32 and 42 can be any of a variety of light emitting elements, for example, light emitting diodes.

Figure 9:
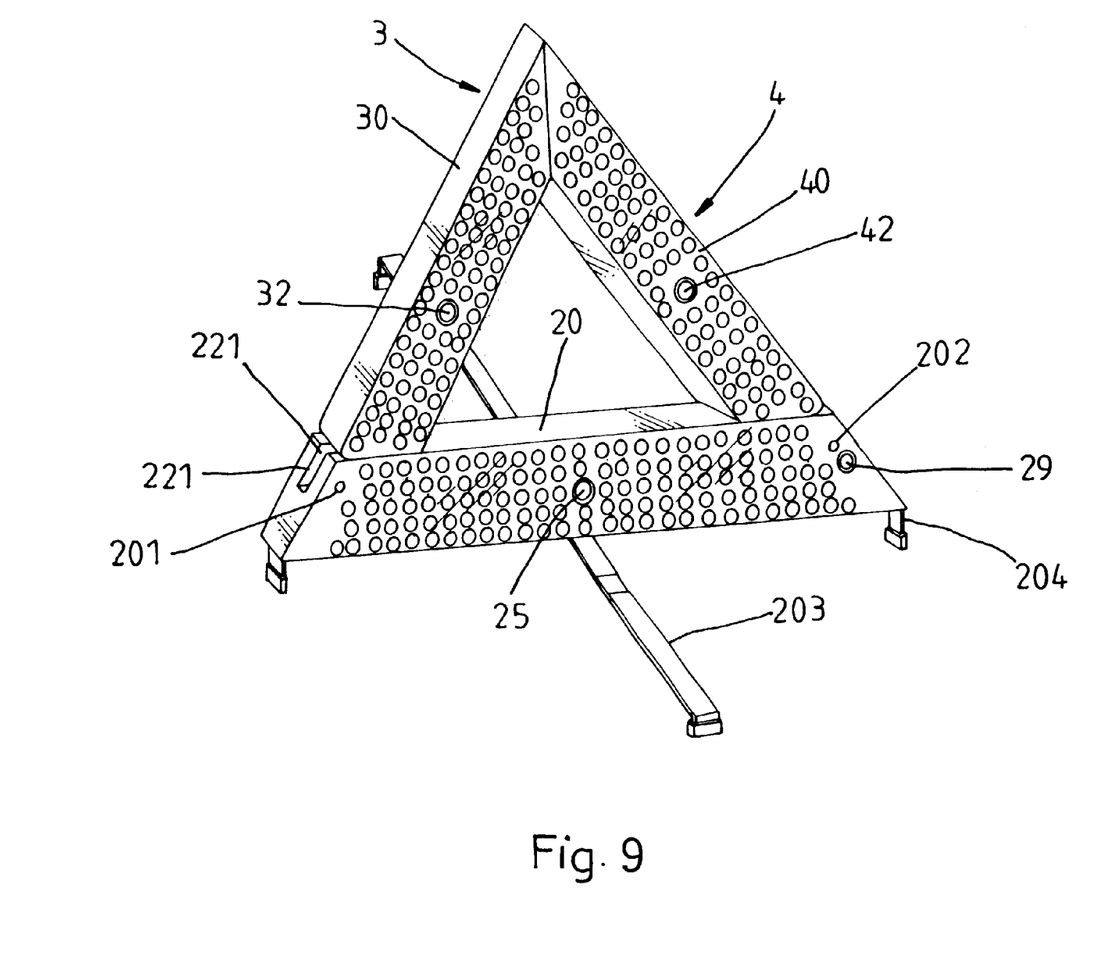
FIG. 9 is an elevational view of an alternate form of the triangle road sign according to the present invention.

FIG. 9 shows an alternate form of the triangle road sign. This alterante form eliminates the aforesaid bottom mounting plate 1, top mounting device 5 and connecting members 7. Further, the bottom rack 2 of this alternate form is mounted with a folding collapsible stand formed of two foot members 203 and 204.

It is to be understood that the drawings are designed for purposes of illustration only, and are not intended for use as a definition of the limits and scope of the invention disclosed.

What is claimed is:

1. A triangle road sign comprising:

a bottom rack, said bottom rack comprising a transparent rack shell, said transparent rack shell comprising a front side, a back side, a first end, and a second end, a signal light mounted in the back side of said transparent rack shell, a control switch mounted on said transparent rack shell, a solar collector in said transparent rack shell to collect solar energy and to convert collected solar energy into electricity for the signal light at said transparent rack shell, an indicator light for indicating a charging status of said solar collector, an alternating current adapter installed in said transparent rack shell for receiving external alternating current power supply, and a battery box installed in said transparent rack shell and controlled by said control switch to provide the necessary working voltage to the signal light at said transparent rack shell;

a bottom mounting plate hinged to said bottom rack for securing said bottom rack to a part in a car;

a transparent left frame bar, said left frame bar comprising a first end pivoted to the first end of said transparent rack shell, a second end, a signal light controlled by said control switch to flash, a raised portion raised from the second end of said left frame bar, and a locating ring adjacent to said raised portion;

a transparent right frame bar, said right frame bar comprising a first end pivoted to the second end of said transparent rack shell, a second end, a signal light controlled by said control switch to flash, a recessed portion formed on the second end of said left frame bar for engagement with the raised portion of said left frame bar, and a locating ring adjacent to said recessed portion;

a top mounting device for securing said left frame bar and said right frame bar to the ceiling of a car, said top mounting device comprising a top mounting plate for fastening to the ceiling of a car, and a bottom coupling loop suspended from said top mounting plate; and two connecting members, said connecting members each having one end terminating in a first hook hooked on the bottom coupling loop of said top mounting device and a bottom end terminating in a second hook hooked on the locating ring at one of said left and right frame bars.

2. The triangle road sign of claim 1, wherein the indicator lights at said bottom rack, said left frame bar and said right frame bar are light emitting diodes.

* * * * *